United States Patent [19]
Gehrs et al.

[11] 3,961,129
[45] June 1, 1976

[54] ELECTRICAL BUSSING AND JUMPER ASSEMBLY

[75] Inventors: Donald F. Gehrs, Affton; David T. Higgins, Imperial, both of Mo.

[73] Assignee: Zinsco Electrical Products, St. Louis, Mo.

[22] Filed: Dec. 11, 1975

[21] Appl. No.: 639,655

[52] U.S. Cl. ............................ 174/72 B; 317/119; 339/198 N
[51] Int. Cl.² ...................... H02B 1/20; H02G 5/00
[58] Field of Search ............... 174/68 B, 70 B, 71 B, 174/72 B; 317/112, 118, 119, 120; 339/22 B, 198 R, 198 N

[56] References Cited
UNITED STATES PATENTS

| | | | |
|---|---|---|---|
| 2,632,039 | 3/1953 | Hammerly et al. | 317/119 |
| 2,738,446 | 3/1956 | Fleming | 317/119 |
| 3,588,620 | 6/1971 | Wasileski | 317/119 |

*Primary Examiner*—Laramie E. Askin
*Attorney, Agent, or Firm*—Peter Xiarhos; Elmer J. Nealon; Norman J. O'Malley

[57] ABSTRACT

An electrical bussing and jumper assembly for use with electrical switching devices such as circuit breakers in a three-phase distribution system. The bussing and jumper assembly comprises three relatively-thin, wide bus plates stacked together in a compact sandwich-like array. Each of the plates has a plurality of openings therein defining a pair of parallel side portions and a plurality of jumper portions transverse to and bridging the side portions. The jumper portions of bus plates are variously concave (top bus plate), flat (center bus plate) and convex (bottom bus plate) and spaced from each other such that when the bus plates are stacked together, the jumper portions are arranged in a ladder-like array and central portions of the jumper portions are all in a common plane. The bus plates are insulated from each other by means of insulative coatings (e.g., of polyvinyl chloride) formed on the plates and also by means of sheets of insulative material (e.g., of polyethylene terephthalate) disposed between the coated bus plates and having openings therein. A comb of insulative material (e.g., of polypropylene) having portions extending through the openings in the bus plates and in the sheets of insulative material is also provided for insulating the jumper portions from each other. Switching devices for use in a current distribution system are attached to the jumper portions of the bus plates, using threaded openings provided in the jumper portions.

14 Claims, 6 Drawing Figures

ELECTRICAL BUSSING AND JUMPER ASSEMBLY

BACKGROUND OF THE INVENTION

The present invention relates to an electrical bussing and jumper assembly and, more particularly, to an electrical bussing and jumper assembly for use with circuit breakers in a panelboard for distributing current to a plurality of branch circuits.

Electrical bussing and jumper assemblies for use in panelboards are very well known to those skilled in the art. One very common type of bussing and jumper assembly, of a three-phase type, employs a plurality (e.g., three) of elongated flat metal bus bars of rectangular cross-section (e.g., 3/16-¼ inch thick) arranged in parallel and spaced from each other by predetermined distances related to the current rating of the assembly. A plurality of discrete metal jumper bars are bolted to the bus bars transverse to the lengths of the bus bars for connection with circuit breakers, the jumper bars being spaced apart from each other through varying lengths of insulating sleeves (e.g., of polyvinyl chloride) made to surround one or more of the bus bars.

The above-described type of bussing and jumper assembly operates in a generally satisfactory manner. However, it has a number of disadvantages. A primary disadvantage is that the jumper bars, by virtue of being discrete elements, must be bolted onto the bus bars. The bolted connections may loosen or the bolts may not be tightened correctly during assembly, leading to poor heat dissipation and reduced efficiency and reliability. Further, the bolting on the jumper bars and the cutting and installation of insulating sleeves of different lengths are costly labor operations increasing the overall cost of the assembly. The use of insulating sleeves as described hereinabove also generally requires that the bus bars be spaced relatively widely apart, with the result that the finished assembly is not as rigid as might otherwise be the case. A further disadvantage of the above-described assembly is that heat produced during use of the assembly is conducted away from the assembly to adjoining elements (sub-pan, etc.) by radiation rather than distributing and dissipating the heat in the manner of a heat sink. This factor is significant when it is considered that excessive heat is a common cause of panelboard failure.

BRIEF SUMMARY OF THE INVENTION

An electrical bussing and jumper assembly is provided in accordance with the present invention which avoids the disadvantages and shortcomings of bussing and jumper assemblies as described hereinabove The electrical bussing and jumper assembly in accordance with the invention includes a plurality of bus plates stacked together in a sandwich-like array. The bus plates have openings therein defining pairs of side portions and a plurality of jumper portions between the openings and bridging the side portions for connection with electrical switching devices. The jumper portions of each bus plate are staggered with respect to the jumper portions of the other bus plates and the jumper portions of all of the bus plates are spaced from each other in a ladder-like fashion in the sandwich-like array. The jumper portions are further of different physical configurations, for example, convex, concave and flat.

The bussing and jumper assembly of the invention further includes insulation means electrically insulating the bus plates from each other and electrical connection means connected to the plurality of bus plates. The connection means are utilized to establish electrical current paths through the bus plate to the jumper portions of the bus plates.

BRIEF DESCRIPTION OF THE DRAWING

Various objects, features and advantages of an electrical bussing and jumper assembly in accordance with the present invention will be apparent from the following detailed description taken in conjunction with the accompanying drawing in which.

DETAILED DESCRIPTION OF THE INVENTION

Figure 1:
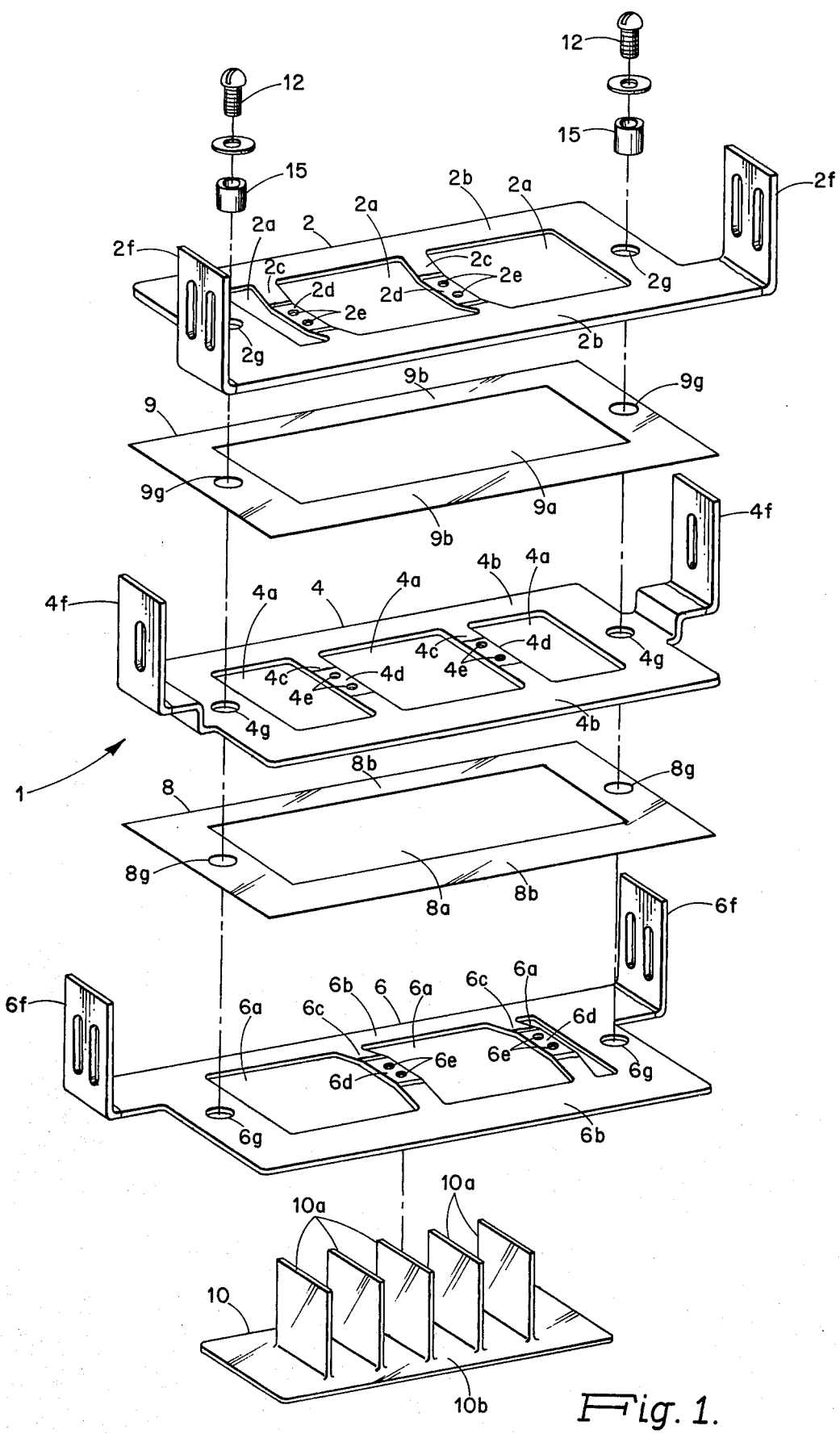
FIG. 1 is an exploded view of an electrical bussing and jumper assembly in accordance with the present invention.

Referring now to FIGS. 1–6, there is shown an electrical bussing and jumper assembly 1 in accordance with the present invention. As shown in the various figures, the bussing and jumper assembly 1 comprises three generally-rectangular, relatively-thin, wide bus plates 2, 4 and 6 separated by thin rectangular sheets 8 and 9 of insulating material, and an insulating comb 10 having portions 10a extending through openings in the bus plates and in the sheets of insulating material 8 and 9. Each of the bus plates 2, 4 and 6 is coated over a major portion thereof by an insulating material, in a manner to be described hereinafter, and includes a plurality of openings or cutouts therein defining parallel side portions and a plurality of jumper portions transverse to and bridging the parallel side portions. Specifically, the bus plate 2 has three generally-rectangular openings 2a therein defining a pair of parallel side portions 2b and a pair of spaced narrow jumper portions 2c transverse to and bridging the parallel side portions 2b, each of the jumper portions 2c further having a generally-flat central pad section 2d with a pair of spaced threaded openings 2e therein. Similarly, the bus plate 4 has three generally-rectangular openings 4a therein defining a pair of parallel side portions 4b and a pair of spaced narrow jumper portions 4c transverse to and bridging the parallel side portions 4b, with each of the jumper portions 2c further having a central pad section 4d with a pair of spaced threaded openings 4e therein. The bus plate 6 similarly has three generally-rectangular openings 6a therein defining a pair of parallel side portions 6b and a pair of spaced narrow jumper portions 6c transverse to and bridging the parallel side portions 6b, with each of the jumper portions 6c further having a generally-flat central pad section 6d with a pair of spaced threaded openings 6e therein. The various threaded openings 2e, 4e and 6e are used to secure electrical switching devices to the assembly 1 as will be explained more fully hereinafter. The aforementioned sheets 8 and 9 of insulating materal, which are used to provide smooth interfaces between the coated bus plates, are also provided with generally-rectangular openings 8a and 9a, respectively, these openings defining parallel side portions 8b and 9b, respectively.

Figure 2:
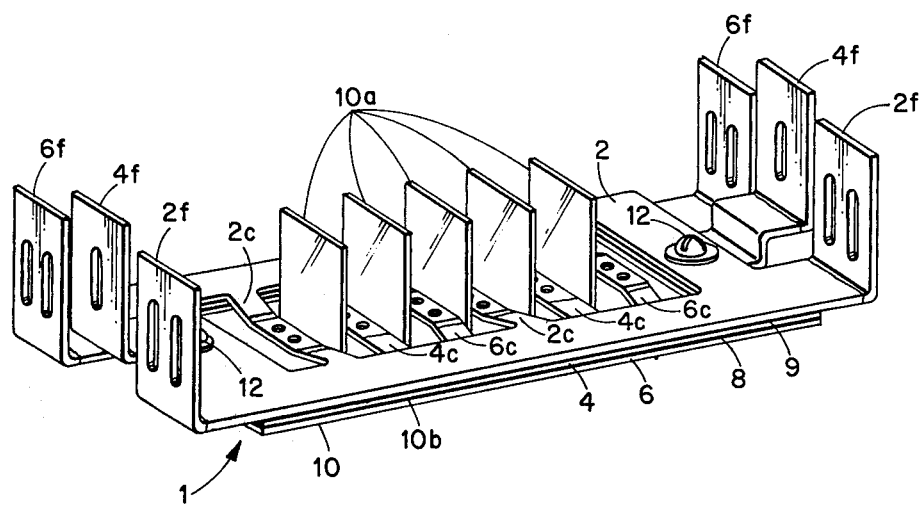
FIGS. 2, 3 and 4 are perspective, side and top views, respectively, of the electrical bussing and jumper assembly in accordance with the present invention.
Figure 3:
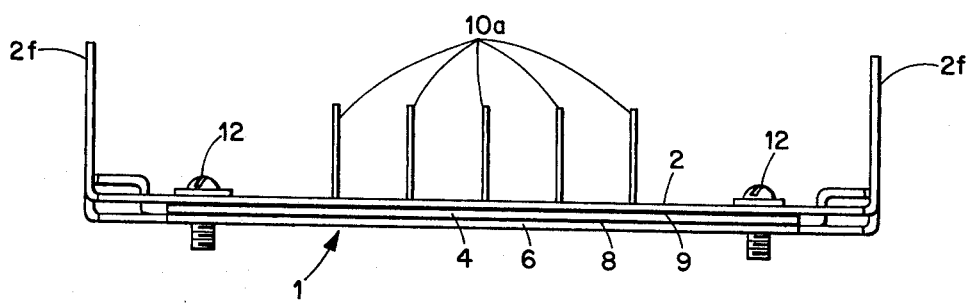
Figure 4:
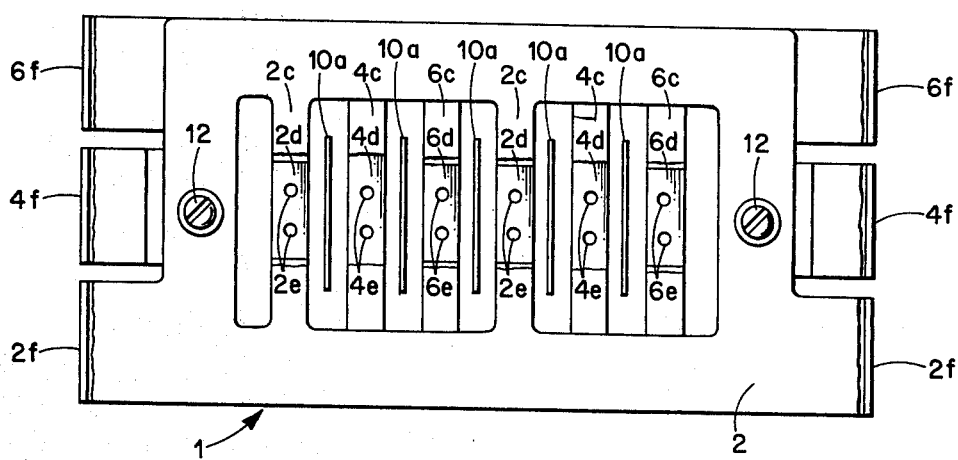
Figure 5:
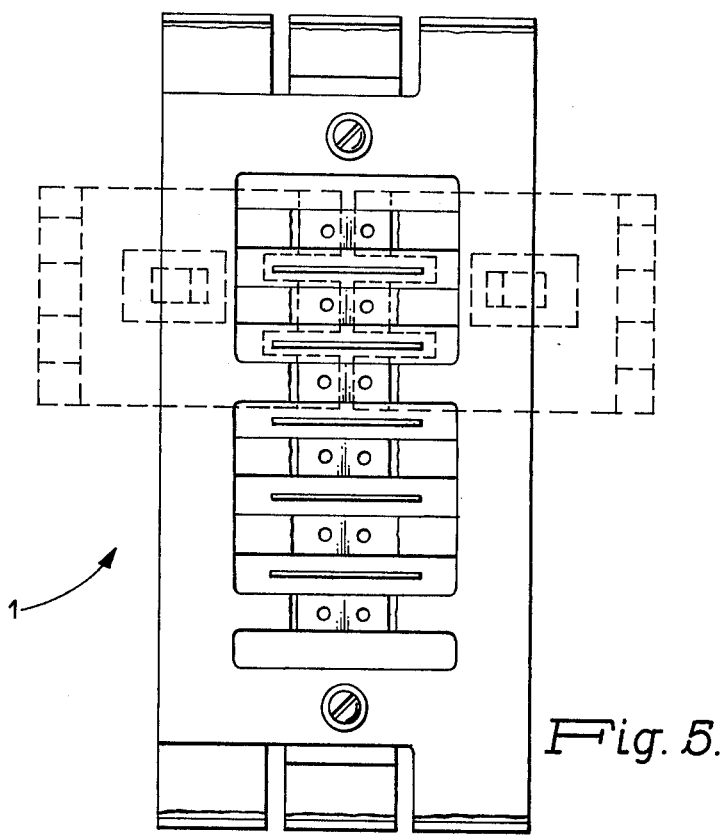
FIGS. 5 and 6 are top views of the electrical bussing and jumper assembly in accordance with the invention showing the manner in which multiple pole and single pole circuit breakers may be used therewith.
Figure 6:
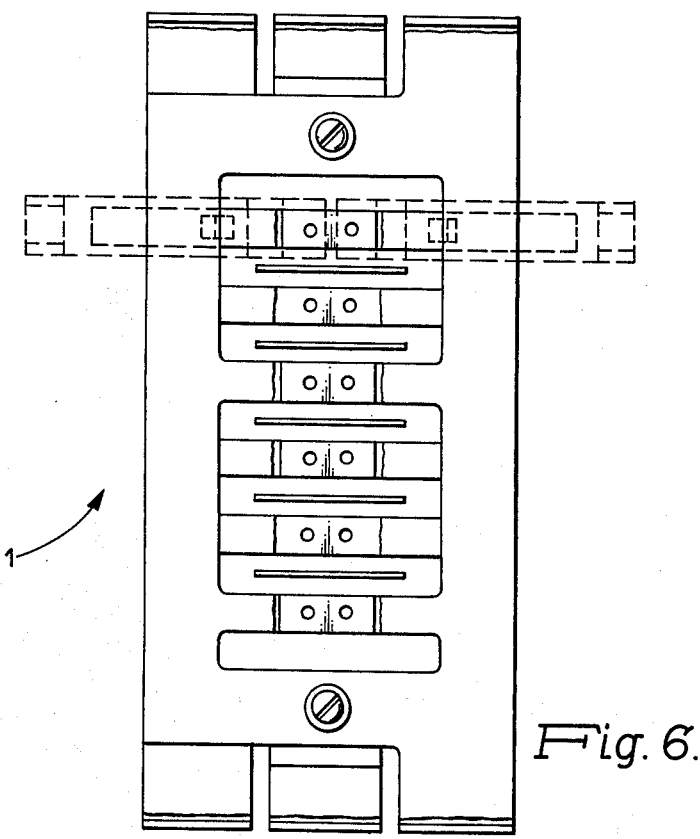

In accordance with the present invention, the above-described jumper portions 2c, 4c and 6c are arranged, specifically, by the particular location and sizing of the openings 2a, 4a and 6a, so that when the individual bus plates and sheets of insulating material are stacked together, in the manner as best shown in FIGS. 2 and 3, the jumper portions are spaced from each other and, as shown in FIG. 2, generally form a ladder-like array. This ladder-like array is possible since, as shown in FIGS. 1–4, the jumper portions of each bus plate are staggered with respect to the jmper portions of the other bus plates. The jumper portions may be staggered so that they are equally spaced from each other in the ladder-like array, as shown in the figures, or, if desired, staggered so that the spacings between them in the ladder-like array are unequal. Typical dimensions for the openings 2a, 4a and 6a of the bus plates 2, 4 and 6 which achieve the equal spacings between jumper portions are as follows:

Openings 2a: top — 2½ in. long by 3 in. wide
center — 2½ in. long by 3 in. wide
bottom — ½ in. long by 3 in. wide
Openings 4a: top — 1½ in. long by 3 in. wide
center — 2½ in. long by 3 in. wide
bottom — 1½ in. long by 3 in. wide
Openings 6a: top — ½ in. long by 3 in. wide
center — 2½ in. long by 3 in. wide
bottom — 2½ in. long by 3 in. wide The widths of the jumper portions 2c, 4c and 6c are typically ½ in. Typical dimensions for the openings 8a and 9a in the sheets 8 and 9 of insulating material are 6½ in. long by 3 in. wide. Each of the bus plates 2, 4 and 6 as described hereinabove typically has a length of 8½ in. and a width of 5 in. Each of the sheets 8 and 9 of insulating material typically has a length of 8½ in., a width of 5 in. and a thickness of 0.01 in. A suitable material for the bus plates 2, 4 and 6 is aluminum (⅛ in. thick) with a 0.02 in. coating of polyvinyl chloride, and a suiable material for the sheets 8 and 9 of insulating material is a polyethylene terephthalate material such as commonly sold under the trademark "Mylar". The aforementioned insulating comb 10, which is used to provide insulation between the jumper portions of the bus plates 2, 4 and 6, has a flat portion 10b of dimensions 6 in. long by 1-13/16 in. wide. The abovementioned portions 10a are typically 1/32 thick by 1-13/16 in. by 1⅛ in. and spaced apart on centers by 1 in. A suitable material for the comb 10 is polypropylene.

Further, in accordance with the invention, the aforedescribed jumper portions 2c, 4c and 6c are arranged so that when the bus plates and sheets of insulating material are stacked together as previously mentioned, the flat central pad sections 2d, 4d and 6d of the jumper portions lie in a common plane. To achieve this result, and as indicated in FIG. 1, the jumper portions 2c of the bus plate 2 are made to be slightly concave, the jumper portions 4c of the bus plate 4 are left flat, and the jumper portions 6c of the bus plate 6 are made to be slightly convex. A typical value for the heights of the concave jumper portions 2c and the convex jumper portions 6c, measured at the flat central sections thereof, is 5/16 in.

The bus plates 2, 4 and 6 as described hereinabove further have pairs of connecting members 2f, 4f and 6f formed integrally at the ends thereof for use in making electrical connections with external components for establishing current paths to the jumper portions of the bus plates. As indicated in the figures, especially FIG. 2, the pairs of connecting members 2f, 4f and 6f are arranged with respect to the ends of the bus plates 2, 4 and 6 so that when the bus plates and sheets of insulating material are superimposed over each other as previously described, the pairs of the connecting members 2f, 4f and 6f are staggered with respect to each other and do not physically interfere with each other. This staggered relationship is readily and simply achieved by forming the connecting members 2f at the right-hand corners of the bus plate 2, by forming the connecting members 4f centrally of the bus plate 4, and by forming the connecting members 6f at the left-hand corners of the bus plate 6.

As previously indicated, the bus plates 2, 4 and 6 are coated over the major portions thereof with an insulating material. The coating of the plates 2, 4 and 6 may be readily achieved using well-known fluidized bed coating techniques. By way of example of how these techniques may be used with the present invention, the uncoated bus plates 2, 4 and 6 may first be heated to a temperature of approximately 600°F for approximately 10 minutes, then dipped in a fluidized power bed (e.g. of polyvinyl chloride) and post-heated for approximately 10 seconds at approximately 600°F. After cooling of the plates 2, 4 and 6, the insulation of the flat pad sections 2d, 4d and 6d and on the connecting members 2f, 4f and 6f may be removed therefrom by physically stripping the insulation away from these parts. (Alternatively, the pad sections 2d, 4d and 6d and the connecting members 2f, 4f and 6f may be masked prior to the coating of the plates 2, 4 and 6). Once the above-described processing of the plates 2, 4 and 6 has been completed, the flat pad sections 2d, 4d and 6d are preferably plated with tin, using well-known plating techniques, for increasing the electrical conductivity of the pad sections 2d, 4d and 6d.

To use the above-described bussing and jumper assembly 1 in a panelboard, it is only necessary to attach the assembly to a supporting structure such as a sub-pan (not shown) and, following the insertion of the assembly 1 and supporting structure within an enclosure (also not shown), to make the necessary electrical connections to the connecting members 2f, 4f and 6f and to attach electrical circuit breakers to the assembly 1. The attachment of the assembly 1 to the sub-pan is readily accomplished by inserting threaded fasteners, such as shown at 12 in the figures, through aligned openings 2g, 4g and 6g in the bus plates 2, 4 and 6 and openings 8g and 9g in the sheets of insulating material 8 and 9, and threading these fasteners into corresponding threaded openings in the sub-pan. To insure that the threaded fasteners 12 do not undesirably cut through the insulating coating in the vicinity of the openings 2g, 4g and 6g in the bus plates 2, 4 and 6, a pair of insulating sleeves 15 is preferably first inserted within the openings 2g, 4g, 6g, 8g and 9g, as indicated in FIG. 1, and the threaded fasteners 12 then inserted within the insulating sleeves 15 and secured to the sub-pan. Pairs of circuit breakers, for example, three-phase, three-pole circuit breakers having spacings therein for receipt of portions 10a of the comb 10, may be attached to the assembly 1 in a side-by-side manner, for example, as shown in phantom in FIG. 5, by securing first sides of each pair of breakers to the flat pad sections of three different jumper portions, as by using screws with the threaded openings in the pad sections, and then securing the other sides of the breakers to members (e.g., rails) associated with the sub-pan. Alternatively, pairs of single-pole, single-phase circuit breakers may be attached to the assembly 1 in a side-by-side manner, for example, as shown in phantom in FIG. 6, by securing first sides of each pair of breakers to the flat pad section of a jumper portion, and then securing the other sides of the breakers to rails associated with the sub-pan.

It will now be apparent that an electrical bussing and jumper assembly 1 has been described which offers significant advantages over prior art assemblies. The assembly 1, by virtue of the use of bus plates in a stacked array with centrally-located jumper portions, has substantial strength and rigidity and is able to act as a heat sink in conducting heat away therefrom as an effective single integral unit rather than by several discrete, spaced parts. Further, the forming of the jumper portions integrally with the bus plates eliminates the problem of loose or incorrectly installed bolts and jumper bars, poor heat dissipation, and poor electrical connections. The coating of the bus plates with an insulating material such as polyvinyl chloride eliminates the costly labor operations of cutting and fitting sleeves of insulating material of varying lengths.

While there has been described what is considered to be a preferred embodiment of the invention, it will be apparent to those skilled in the art that various changes and modifications may be made therein without departing from the invention as called for in the appended claims.

What is claimed is:

1. An electrical bussing and jumper assembly for use with electrical switching devices, said assembly comprising:
    a plurality of bus plates stacked together in a sandwich-like array, said bus plates having openings therein defining pairs of side portions and defining a plurality of jumper portions between the openings and bridging the side portions for connection with electrical switching devices, the jumper portions of each bus plate being staggered with respect to the jumper portions of the other bus plates and the jumper portions of all of the bus plates being spaced from each other in a ladder-like fashion in the sandwich-like array, said jumper portions being of different physical configurations;
    insulation means electrically insulating the bus plates from each other; and
    electrical connection means connected to the plurality of bus plates for establishing electrical current paths through said bus plates to the jumper portions of the bus plates.

2. An electrical bussing and jumper assembly in accordance with claim 1 wherein:
    the jumper portions are variously convex, concave and flat in configuration.

3. An electrical bussing and jumper assembly in accordance with claim 2 wherein:
    the insulating means includes insulation material coated onto each of the bus plates.

4. An electrical bussing and jumper assembly in accordance with claim 3 wherein:
    the insulation material is polyvinyl chloride.

5. An electrical bussing and jumper assembly in accordance with claim 1 wherein:
    each of the bus plates has a plurality of spaced openings therein defining a pair of side portions and a plurality of jumper portions generally transverse to the side portions.

6. An electrical bussing and jumper assembly in accordance with claim 5 wherein:
    the openings in each of the bus plates are sized and positioned with respect to each other and with respect to the openings in the other bus plates so that the jumper portions of all of the bus plates are equally spaced from each other in a ladder-like fashion in the sandwich-like array.

7. An electrical bussing and jumper assembly in accordance with claim 1 wherein the insulation means includes:
    an insulating comb having a portion underlying the bus plates and a plurality of portions extending from the aforesaid portion through openings in the bus plates and adjacent to the jumper portions of the bus plates.

8. An electrical bussing and jumper assembly in accordance with claim 1 wherein:
    the jumper portions of the different bus plates have generally-flat pad sections for connection with electrical switching devices, all of the pad sections lying in a common plane.

9. An electrical bussing and jumper assembly in accordance with claim 8 wherein:
    the insulation means includes insulation material coated onto each of the bus plates.

10. An electrical bussing and jumper assembly in accordance with claim 9 wherein:
    the insulation material is polyvinyl chloride.

11. An electrical bussing and jumper assembly in accordance with claim 9 wherein:
    the insulation means further includes sheets of insulating material disposed between the bus plates, said sheets of insulating material having openings therein generally coinciding with the area of the jumper portions of the bus plates.

12. An electrical bussing and jumper assembly in accordance with claim 11 wherein the insulation means further includes:
    an insulating comb having a portion unerlying the bus plates and a plurality of portions extending from the aforesaid portion through openings in the bus plates and adjacent to the jumper portions of the bus plates.

13. An electrical bussing and jumper assembly in accordance with claim 12 wherein:
    the pad sections of the jumper portions having openings therein for use in attaching electrical switching devices to said pad sections.

14. An electrical bussing and jumper assembly in accordance with claim 13 wherein:
    the electrical connection means includes pairs of connecting members connected in a staggered manner to opposite ends of the bus plates.

* * * * *